Sept. 1, 1942.  J. H. MURCH  2,294,418
WELDING MACHINE
Filed Dec. 16, 1939   3 Sheets-Sheet 1

INVENTOR
John H. Murch
BY
ATTORNEYS

Sept. 1, 1942.   J. H. MURCH   2,294,418
WELDING MACHINE
Filed Dec. 16, 1939   3 Sheets-Sheet 2
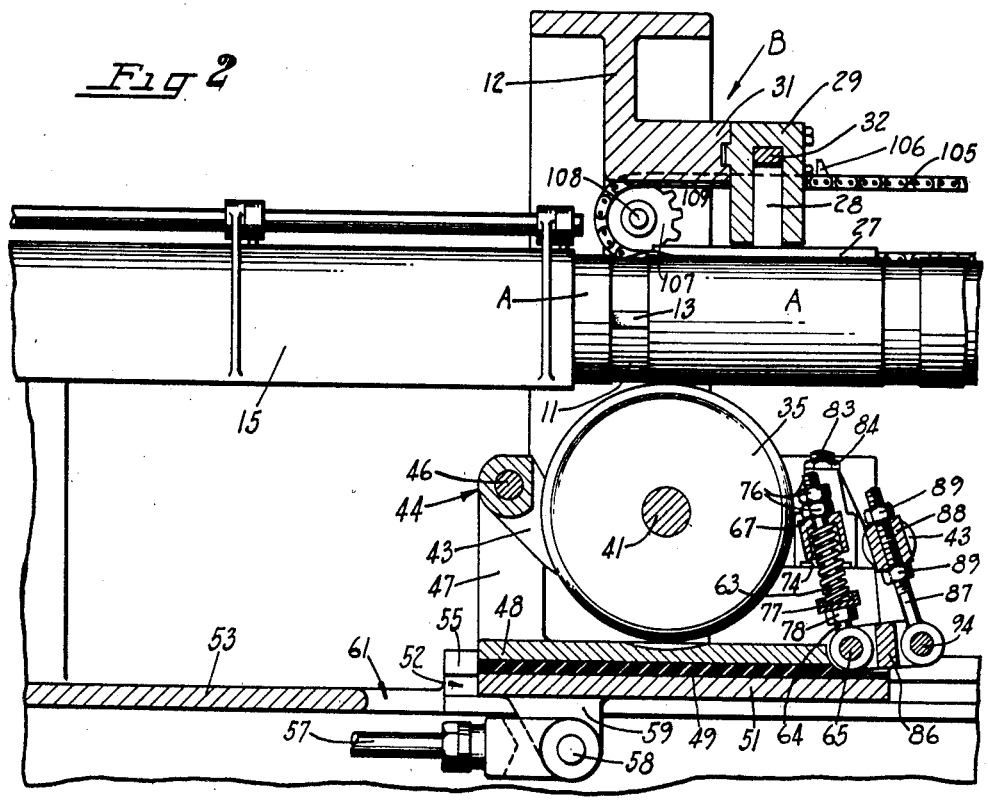
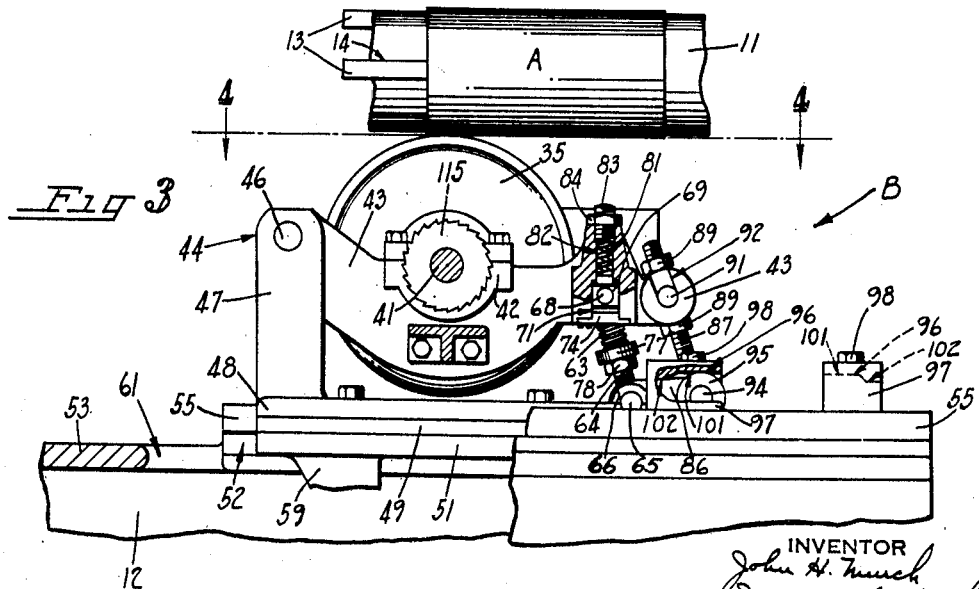
INVENTOR
John H. Murch
BY
ATTORNEYS

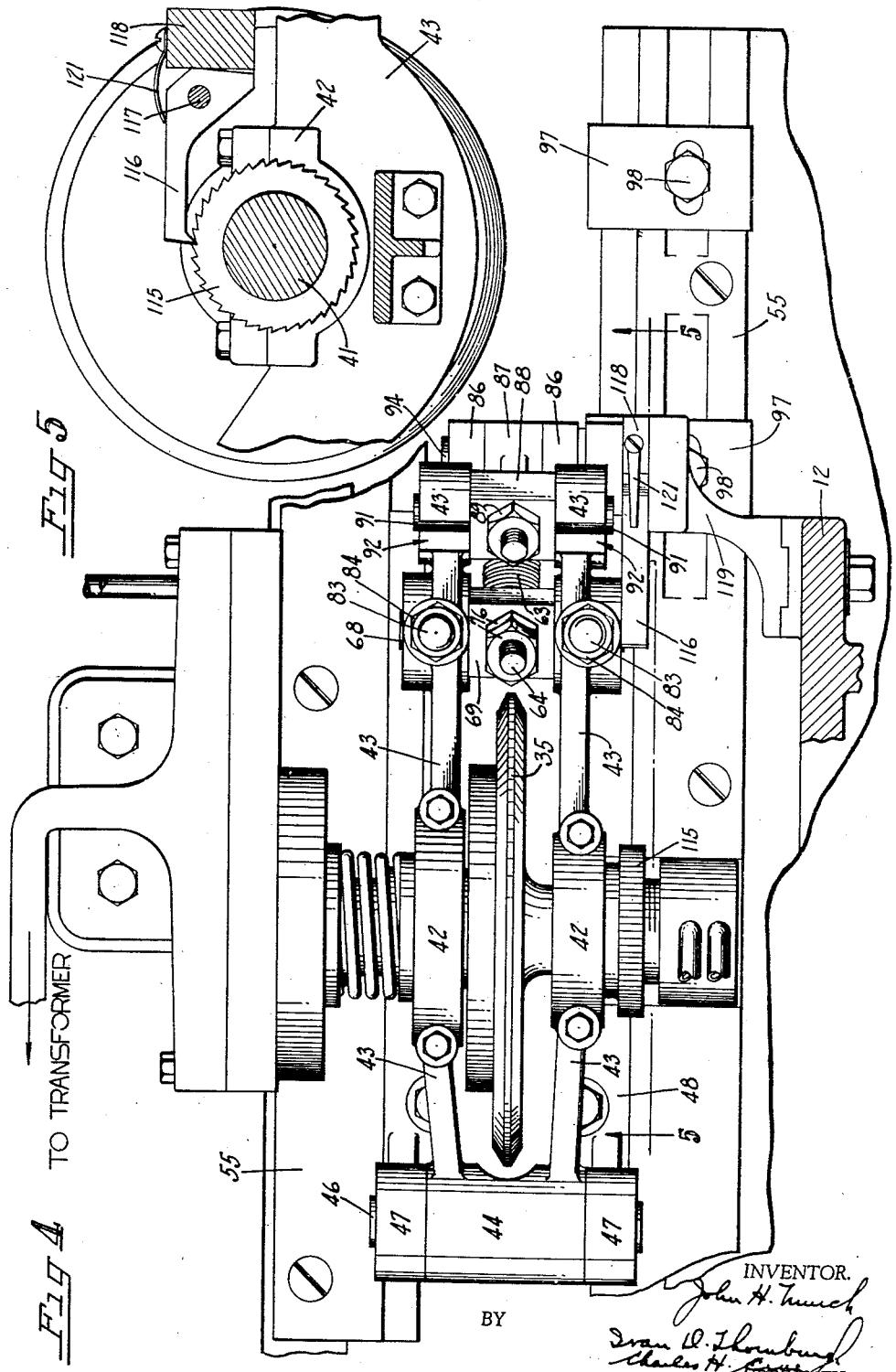

Patented Sept. 1, 1942

2,294,418

UNITED STATES PATENT OFFICE 2,294,418

WELDING MACHINE

John H. Murch, East Orange, N. J., assignor to American Can Company, New York, N. Y., a corporation of New Jersey Application December 16, 1939, Serial No. 309,659

8 Claims. (Cl. 219—6)

The present invention relates to welding machines and has particular reference to a rotatable electrode yieldably mounted for movement relative to the work to be welded and arranged to move into and out of engagement with the work for the welding operation.

In the sheet metal container or can industry, can bodies are preferably produced in mass production by continuous processes in which the bodies move along in a procession one following the other. Where the side seam edges of the bodies are secured together by welding, some difficulty has been experienced in mounting the outer welding electrode so that proper adjustments for welding pressures, electrode position, contact between electrode and work and the like can be obtained in a continuously operating automatic machine.

The instant invention contemplates overcoming these difficulties by providing an electrode mounting which may be used in such an automatic machine and which is both yieldable and adjustable.

An object therefore of the invention is the provision, in a machine for producing a continuous weld, of an electrode which is movable relative to the work to be welded wherein the electrode shifts into and out of engagement with the work as it travels therealong for the welding operation so that the work may be automatically moved into and out of the welding station without interference with the electrode.

Another object is the provision of such an electrode device wherein the electrode is movable toward and away from a work support and in time with the passage of the work along the support, so that the electrode is positively brought into contact with the work at a predetermined point for the welding operation instead of rolling up onto the work over the edge thereof, the electrode also being movable away from the work at a predetermined point, as at the termination of the welding operation.

Another object is the provision of an electrode device of this character wherein the electrode is supported in a movable cradle yieldably mounted so that the electrode may be adjusted for location relative to the work support when it moves into engagement with the work.

Another object is the provision of such an electrode device wherein the electrode may be set for a predetermined welding pressure which is effective only during the welding operation.

Another object is the provision of such an electrode device wherein a welding operation is performed on one piece of work when the electrode moves in one direction and another welding operation is performed on another piece of work when the electrode moves in another direction, thereby effecting a welding operation on two different pieces of work for each complete movement of the electrode.

Numerous other objects and advantages of the invention will be apparent as it is better understood from the following description, which, taken in connection with the accompanying drawings, discloses a preferred embodiment thereof.

Referring to the drawings:

Fig. 2 is an enlarged longitudinal section at the welding station of the machine shown in Fig. 1, with parts broken away;

Fig. 3 is an elevation of the welding electrode and its supporting parts shown in Fig. 2, with parts broken away and other parts shown in section;

Fig. 4 is a greatly enlarged top plan view of the welding electrode and its supporting parts as viewed substantially along a plane indicated by the line 4—4 in Fig. 3, with parts broken away and other parts in section; and Fig. 5 is a sectional view taken substantially along the line 5—5 in Fig. 4.

Figure 1:
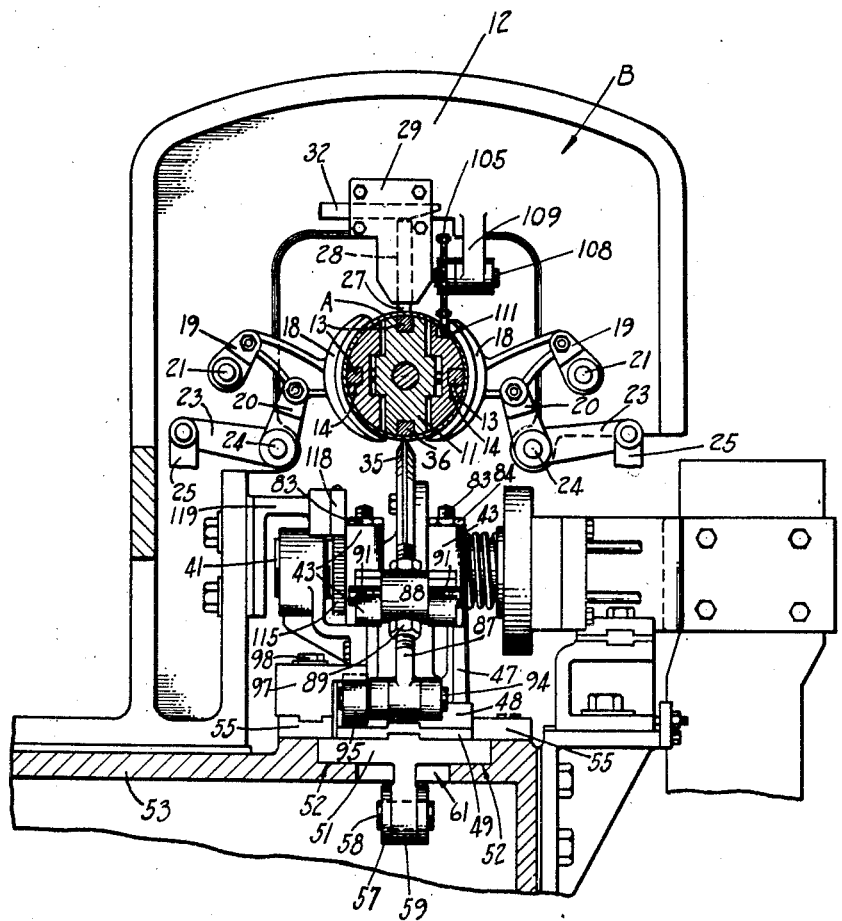
Figure 1 is a transverse sectional view through a welding machine embodying the instant invention; with parts broken away.

As a preferred embodiment of the instant invention the drawings illustrate principal parts of a sheet metal can body forming and welding machine of the character disclosed in United States Patent 2,047,964, issued July 21, 1936, to J. M. Hothersall on Electric welding. In such a machine flat can body blanks are first formed into incomplete cylindrical can bodies having their side seam edges spread apart and are so advanced along a horizontal support in a continuous procession in timed and spaced order.

In the instant invention the partially formed can bodies, indicated by the letter A (Fig. 2) are supported on a horizontal mandrel or horn 11 (Figs. 1, 2 and 3) which is retained in a machine main frame 12. The bodies are advanced along the horn in step-by-step fashion by reciprocating feed bars 13 which slide in grooves 14 formed in the horn. The feed bars are actuated in any suitable manner in time with the other moving parts of the machine. While moving along the horn the partially formed bodies are held against displacement by curved guide rails 15 which surround the horn.

Partially formed can bodies A moving along the horn 11 are advanced into a welding station B (Figs. 1 and 2) where they momentarily come to rest. At this station the side seam edges of the bodies are brought into overlapping relation in preparation for the welding operation. Overlapping of the body edges is preferably effected by a pair of side wings 18 (Fig. 1) disposed one on each side of the horn and carried on movable arms 19, 20. Arms 19 are mounted on pivot shafts 21 carried in the frame 12. The arms 20 are formed as part of levers 23 which are mounted on pivot studs 24 carried in the frame 12. These levers are connected by links 25 to any suitable means for actuating them in time with the other moving parts of the machine.

During this overlapping of the body side seam edges, the partially formed body is clamped against movement by a clamp bar 27 (see also Fig. 2) which is disposed above the horn 11. The bar is formed with an upright stem 28 carried in a bracket 29 secured to a boss 31 formed on the frame 12. A wedge block 32 carried in the bracket above the clamp bar stem engages against the latter and thus forces the clamp bar down onto the can body on the horn. This wedge block is actuated in any suitable manner in time with the other moving parts of the machine. These devices so far explained are usual devices in can body forming machines.

While a partially formed can body A is thus held clamped in position on the horn at the welding station, its overlapped side seam edges are secured together preferably by welding them into a unitary side seam. The welding operation is performed by a rotatable disc electrode 35 which travels along the lapped side seam edges of the stationary can body. A stationary bar electrode 36 longitudinally disposed within the horn 11, cooperates with the disc electrode in performing the welding operation. Electric energy is supplied to these electrodes in any suitable manner from an appropriate source of supply.

A welding operation is performed by these electrodes upon the passage in each direction of the lower or disc electrode 35. That is to say, the side seam edges of one can body will be welded when the electrode 35 passes from right to left, as viewed in Figs. 2 and 3. At the end of this operation, the electrode 35 remains at the left while the welded body is discharged from the welding station and a new body to be welded is brought into place. The electrode then travels back toward the right and on its return it welds the newly positioned can body. Hence one complete or full stroke of the electrode welds two separate can bodies. In this manner, less time is utilized in performing the welding operation and hence the can bodies may be advanced through the machine more rapidly.

In order to effect such a double pass welding feature the disc electrode 35 is shifted laterally of the horn 11 as well as parallel with it. For this purpose the electrode 35 is mounted on a short shaft 41 which is carried in a pair of spaced split bearings 42 (see also Fig. 4) formed in spaced arms 43 of a cradle 44. One end of the cradle is supported on a pivot shaft 46 carried in bearing lugs 47 formed on a slide bracket 48. The slide bracket is secured to an insulating block 49 which is mounted on a reciprocating slide member 51. The slide in turn is carried in slideways 52 formed in a horizontal web section 53 of the frame 12. Gibs 55 secured to the web section confine the slide against vertical displacement.

Reciprocation of the slide 51 is brought about by a link 57 (Figs. 1 and 2) which is actuated by any suitable means operating in time with the other moving parts of the machine. This link is connected to a pivot pin 58 carried in a depending lug 59 formed on the bottom of the slide. The lug extends down through a slot 61 formed in the web section 53.

At the beginning of a welding operation the pivotally mounted electrode cradle 44 is moved toward the horn 11 through a yieldable connection adjacent its outer end (at the right in Figs. 2 and 3) in order to bring the electrode 35 into contact with the can body. This yieldable connection includes a stiff main compression spring 63 which is coiled around a vertically disposed eye bolt 64 and which carries the main weight of the cradle and the parts supported therein. The lower end of the eye bolt is mounted on a pivot pin 65 carried in lugs 66 (Fig. 3) formed on the slide bracket 48.

The upper end of the eye bolt 64 extends through a swivel block 67 having trunnions 68 mounted in bearing slides 69 located in slots 71 formed in the cradle arms 43. Caps 74 secured to the arms over the lower ends of the slots retain the bearing slides in place. Lock nuts 76 on the upper end of the eye bolt are provided to confine the main spring 63 and to provide for tension adjustment. The lower end of the spring abuts against a cup washer 77 which is held in place by a nut 78 on the eye bolt.

When the electrode 35 is in welding position adjacent a can body on the horn 11 it is forced against the body under a predetermined welding pressure which is exerted by a pair of compression springs 81 (Fig. 3). These springs are smaller and weaker than the main supporting spring 63. The pressure springs are disposed in vertical confining bores 82 formed in the cradle arms 43 and are in alignment with and above the bearing slides 69. The lower ends of the springs abut against the tops of the bearing slides while the upper ends press against compression adjusting set screws 83 threaded into the bores. Lock nuts 84 are provided for holding the set screws in adjusted position (see also Fig. 4). By adjustment of these set screws a desired predetermined electrode pressure may be had on the can body.

At the end of a welding stroke of the electrode 35, it is positively shifted away from the welded can body on the horn 11 and held in spaced relation thereto in order to permit discharge of the welded body from the welding station and to permit a new incoming or unwelded body to be advanced into the station. This movement is effected by cams which actuate a lever arm 86 (Figs. 2 and 3).

The inner end of the lever arm straddles the main spring eye bolt 64 and is carried on the bolt pivot pin 65. The outer end of the lever arm is also bifurcated and is connected with an eye bolt 87 and with the outer ends of the cradle arms 43. The upper end of the eye bolt extends through a swivel block 88 (see also Fig. 4) and is locked in adjusted position by lock nuts 89. The swivel block is formed with trunnions 91 which operate in slots 92 formed in the ends of the cradle arms 43.

The lower end of the eye bolt 87 is mounted on a pivot pin 94 which is carried in the outer ends of the lever arm 86 and thus provides the connection previously referred to. This pivot pin 94 extends beyond the lever arm and carries a cam roller 95 (Fig. 1). At times the roller operates against cam surfaces 96 (Fig. 3) formed in a pair of spaced and stationary cam blocks 97 adjustably secured by cap screws 98 to one of the slide gibs 55 (the left as viewed in Fig. 1). These cam surfaces are formed with high sections 101 and low sections 102 (Fig. 3). The cams are so spaced as to be engaged only at the ends of the stroke of the electrode 35.

Hence while the electrode 35 is rolling along a can body side seam during a welding operation the cam roller 95 is between and free of the cams 97. The main spring 63 holds the electrode in position adjacent the can body during this travel while the pressure springs 81 press the electrode against the body with a desired welding pressure. Near the end of the can body, depending upon which direction the electrode is traveling, the cam roller enters the adjacent cam 97 and rolls along its high section 101.

Precisely at the end of the can body the cam roller engages the low section 102 of the cam surface and thereby rocks the lever arm 86 downwardly. The cradle 44 is thus depressed or rocked away from the horn 11 and accordingly the electrode is drawn out of contact with the can body. The welding operation thereupon ceases. This action prevents the electrode from running off onto the horn and thus directly contacting the inside electrode 36. The cam roller remains in engagement with the low section 102 of its cam while the electrode is at rest at the end of its stroke and hence maintains the electrode in a depressed position in spaced relation to the horn 11.

After the can body has been welded the holding clamp 27 and wings 18 are withdrawn and the released body is then discharged from the welding station. A new body is immediately brought into the welding station and is clamped in position. The electrode 35 thereupon begins its return stroke. At the start of this stroke the cam roller 95 rolls along the low section 102 of the cam 97 it is operating in.

Precisely at the beginning or at the edge of the can body side seam portions the cam roller rides off the low section 102 of the cam and onto the high section 101. This permits the cradle to rise under the pressure of its main spring 63 and to thereby bring the electrode 35 into engagement with the can body at the beginning of its side seam. This prevents the electrode from first contacting the inner electrode 36 in the horn and then riding up over the edge of the body onto the side seam. At contact welding begins.

During the remainder of the return stroke the electrode rolls along the side seam and effects the welding operation on this second can body. Near the opposite end of the body the cam roller enters the companion cam 97 and precisely at the end of the body seam the electrode is drawn away, as hereinbefore explained, to terminate the welding operation. Thus complete control may be had over the length of the weld made by the electrode 35. This control is made effective by setting the spacing and position of the cams 97.

Discharge of the welded can body from the welding station may be effected in any suitable manner. The drawings illustrate a preferred form of device which comprises an endless chain conveyor 105 (Fig. 2) having feed dogs 106 secured thereto at spaced intervals along its length. The chain takes over a sprocket 107 mounted on a short shaft 108 carried in a bearing lug 109 formed on the frame 12 (see also Fig. 1). The chain operates in a groove 111 formed in the horn 11 and is continuously actuated in any suitable manner in time with the other moving parts of the machine.

Hence immediately after a welding operation a dog 106 of the chain 105 comes into engagement with the welded can body and propels it along the horn, away from the welding station. The engaged can body is advanced for further operations thereon or may be discharged to any suitable place of deposit, as desired.

To prevent burning or pitting of the electrode 35 provision is made for partially rotating it at the end of each complete stroke so that a different part of the electrode surface will be used during the next welding operation. This is brought about by a ratchet wheel 115 (Figs. 1, 3 and 5) which is secured to the electrode shaft 41. The ratchet wheel is actuated by a pawl 116 mounted on a pivot pin 117 carried in a stationary block 118 secured to a bracket 119 bolted to the main frame 12.

Thus on the return stroke of the electrode 35 the ratchet wheel moves against the pawl 116 and is thereby rotated through a partial revolution. This rotates the electrode. A flat spring 121 secured to the stationary block 118 bears down on the pawl and holds it in engagement with the ratchet wheel during this rotation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a welding machine, the combination of a stationary work support, a stationary welding electrode in said support, a slide member disposed adjacent said support, a cooperating electrode pivotally mounted on said slide member and movable therewith along the work on the support for performing a welding operation thereupon, means for moving said slide member, means for normally urging said movable electrode into engagement with the work for a welding operation, and means disposed in the path of said slide member and engageable therewith for shifting said movable electrode out of engagement with the work at the conclusion of said welding operation.

2. In a welding machine, the combination of a stationary work support, a stationary welding electrode in said support, a cooperating electrode disposed outside of said support and movable along the work on the support for performing a continuous welding operation thereupon, spring pressure means for urging said movable electrode against the work for a welding operation with a predetermined pressure, means for adjusting the tension of said spring pressure means, and means disposed in the path of said movable electrode and engageable therewith for shifting the same out of engagement with the work at the conclusion of such welding operation against the tension of said spring pressure means, the latter being operative to again urge said movable electrode against the work for a succeeding welding operation after said electrode moves out of engagement with said shiftable means.

3. In a welding machine, the combination of a stationary work support, a stationary welding electrode in said support, a reciprocating slide member mounted adjacent said support, a cradle pivotally mounted on said slide member having an outside electrode pivotally mounted thereon, said cradle being movable with said slide member in a path of travel adjacent said work support for moving the electrode carried thereby along the work to be welded, means for reciprocating said slide member relative to and along said support, yieldable means disposed between said slide member and said cradle for normally urging the latter towards the work for a welding operation, and means disposed in the path of said slide member and engageable therewith for shifting said cradle and said outside electrode out of engagement with the work at the conclusion of the welding operation against the tension of said yieldable means.

4. In a welding machine, the combination of a stationary support, means for advancing successive articles to be welded in a step-by-step motion along said support, a stationary welding electrode carried by said support, a cooperating movable electrode disposed outside of said support, means for reciprocating said movable electrode in opposite directions relative to said support and said stationary electrode, yieldable means normally urging said movable electrode toward said support for performing successive welding operations on the articles advanced thereon, and spaced means disposed in the path of said movable electrode at the end of its movement in each direction for shifting the same out of engagement with a said article to be welded at the conclusion of a welding operation, one of said shiftable means being operative to move said outside electrode out of engagement with an article at the conclusion of a welding operation by movement of said electrode in one direction, and the other of said shiftable means being operative to move said outside electrode out of engagement with a succeeding article at the conclusion of a welding operation by movement of said electrode in the opposite direction.

5. In a welding machine, the combination of a stationary work support, a stationary welding electrode in said support, a reciprocating slide mounted for movement adjacent said work support, a cradle having one end pivotally supported on said slide and having its opposite end yieldably supported on the slide, a cooperating rotatable electrode outside said work support and carried in said cradle for rolling action along the work to be welded, a pair of spaced stationary cams disposed adjacent the path of travel of said slide, and means connected with the yieldable end of said cradle and operable by said cams for shifting said outside electrode into engagement with the work at the beginning of the welding operation and for withdrawing the electrode from the work at the end of the welding operation.

6. In a welding machine, the combination of a longitudinally disposed stationary work support, a stationary bar welding electrode housed within said support, a cooperating rotatable electrode mounted outside said support and movable along the work on the support, means for moving said rotatable outside electrode along the work for performing a welding operation thereupon, means for urging said outside electrode against the work to engage the same between said outside electrode and said stationary bar electrode at the beginning of the welding operation, means disposed in the path of said rotatable electrode and engageable therewith for withdrawing the electrode from the work at the conclusion of a welding operation, and instrumentalities also disposed in the path of said rotatable electrode for periodically rotating the same after a welding operation in order to bring a different portion of its welding surface into position for a succeeding welding operation to prevent burning and pitting of the rotatable electrode.

7. In a sheet metal can body welding machine having means for advancing can bodies in a step-by-step movement in a continuous procession along a stationary support to a welding station, a stationary welding electrode in said support and a cooperating movable electrode having means for reciprocating the same in opposite directions in alignment with the side seams of positioned can bodies at said station: the improvement characterized by providing means for disengaging said movable electrode from a can body at the conclusion of a welding operation performed by movement of the electrode in one direction to permit such welded body to be advanced from the welding station, said disengaging means being further operative to reengage said movable electrode with a succeeding positioned can body for a welding operation thereon when said electrode is moved in the opposite direction through the welding station.

8. In a sheet metal can body welding machine having means for advancing can bodies in a step-by-step movement in a continuous procession along a stationary support to a welding station, a stationary welding electrode in said support and a cooperating movable electrode having means for reciprocating the same in opposite directions in alignment with the side seams of positioned can bodies at said station: the improvement characterized by providing means disposed in the path of said movable electrode and engageable thereby for disengaging the same from a can body at the conclusion of a welding operation performed by movement of the electrode in one direction to permit such welded body to be advanced from the welding station, and means for reengaging said electrode with a succeeding positioned can body for a welding operation thereon by movement of the electrode in the opposite direction and after said electrode has moved out of engagement with said means disposed in the path thereof.

JOHN H. MURCH.